US010471889B2

(12) United States Patent
Santucci et al.

(10) Patent No.: US 10,471,889 B2
(45) Date of Patent: Nov. 12, 2019

(54) MOTORCYCLE WITH ELECTRONIC CONTROL OF THE EMERGENCY LIGHTS

(71) Applicant: PIAGGIO & C. SPA, Pontedera (IT)

(72) Inventors: Mario Donato Santucci, Pontedera (IT); Onorino Di Tanna, Pontedera (IT)

(73) Assignee: PIAGGIO & C. SPA, Pontedera (IT)

( * ) Notice: Subject to any disclaimer, the term of this patent is extended or adjusted under 35 U.S.C. 154(b) by 0 days.

(21) Appl. No.: 16/322,567

(22) PCT Filed: Jul. 19, 2017

(86) PCT No.: PCT/IB2017/054372
§ 371 (c)(1),
(2) Date: Feb. 1, 2019

(87) PCT Pub. No.: WO2018/025109
PCT Pub. Date: Feb. 8, 2018

(65) Prior Publication Data
US 2019/0176689 A1    Jun. 13, 2019

(30) Foreign Application Priority Data
Aug. 4, 2016  (IT) .................. 102016000082345

(51) Int. Cl.
*B60Q 1/52*   (2006.01)
*B60Q 1/44*   (2006.01)

(52) U.S. Cl.
CPC    *B60Q 1/52* (2013.01); *B60Q 1/44* (2013.01)

(58) Field of Classification Search
CPC combination set(s) only.
See application file for complete search history.

(56) References Cited

U.S. PATENT DOCUMENTS 6,034,594 A     3/2000  Gray
9,216,686 B2 *  12/2015 Tetsuka ................. B60Q 1/38
9,366,407 B2 *  6/2016  Takenaka ............. B60Q 1/0088
(Continued)

FOREIGN PATENT DOCUMENTS

EP          0475093 A1     3/1992

OTHER PUBLICATIONS

International Search Report for corresponding application PCT/IB2017/054372 filed Jul. 19, 2017; dated Aug. 4, 2016.
(Continued)

*Primary Examiner* — Van T Trieu
(74) *Attorney, Agent, or Firm* — Cantor Colburn LLP

(57) ABSTRACT

A motorcycle including a body having a front part, a tail part and a central part between the front part and the tail part, a front and rear wheel constrained to the body, a traction engine constrained to the body and operatively connected to one of the wheels, an optical emergency signalling device fixed to the body, arranged and oriented to be visible by a vehicle that is following the motorcycle, an electronic control unit operatively connected to the optical emergency signalling device, a detection system adapted to detect the loss of grip and/or a risk of loss of grip of at least one of the two wheels of the motorcycle, where the electronic control unit is adapted and configured to activate the optical emergency signalling device, if the detection system detects a loss of grip and/or a risk of loss of grip.

13 Claims, 2 Drawing Sheets

(56) References Cited

U.S. PATENT DOCUMENTS

2008/0189000 A1* 8/2008 Duong ..................... B60T 7/22
　　　　　　　　　　　　　　　　　　　701/20
2013/0257609 A1　10/2013　Otsuji

OTHER PUBLICATIONS

Written Opinion for corresponding application PCT/IB2017/054372 filed Jul. 19, 2017; dated Aug. 4, 2016.

* cited by examiner

MOTORCYCLE WITH ELECTRONIC CONTROL OF THE EMERGENCY LIGHTS

TECHNICAL FIELD

The present description relates to the technical field of motor vehicles, and in particular relates to a motorcycle with electronic control of the emergency lights.

BACKGROUND

Lighting systems which allow the safe use of motorcycles have been fitted on motorcycles for a long time. Motorcycles are indeed provided with a headlight, a tail light, direction indicators, at least one brake light etc. The headlight makes it possible to illuminate an area of ground arranged in front of the motorcycle and to make the motorcycle visible to people placed in front of the motorcycle. The tail light allows vehicles behind the motorcycle to see the motorcycle. The brake light is used to signal braking in progress to the vehicles behind, in order to prevent collisions between said vehicles and the motorcycle or to reduce the risk of such collisions as much as possible. In particular, the brake light of a motorcycle is automatically activated when the driver actuates the brake level and/or the brake pedal of the motorcycle. Motorcycles are also provided with emergency lights which can be activated manually by a driver. Normally, such emergency lights consist of the same rear direction indicators and of the same front direction indicators, which are activated simultaneously, intermittently and in synchronized manner by manually actuating a single switch.

Motorcycles are subject to a risk of collision by the vehicles behind it more than other vehicles, such as cars, for example, for various reasons. For example, the braking system, and thus the brake light, may be activated in delay by the driver or even if activated in timely fashion such light however does not provide information on the braking intensity. Furthermore, in such cases, it is necessary to signal the presence of the motorcycle to a vehicle behind more efficiently, so as to prevent it from knocking over the motorcycle.

BRIEF SUMMARY

The present description provides a motorcycle having an electronic control of the emergency lights which makes it possible to either overcome or at least partially reduce the problems of the prior art.

BRIEF DESCRIPTION OF THE DRAWINGS

The disclosure will be better understood by the following detailed description of its embodiments, made by way of example and consequently not limiting in any way to the accompanying drawings, in which.

DETAILED DESCRIPTION

Figure 1:
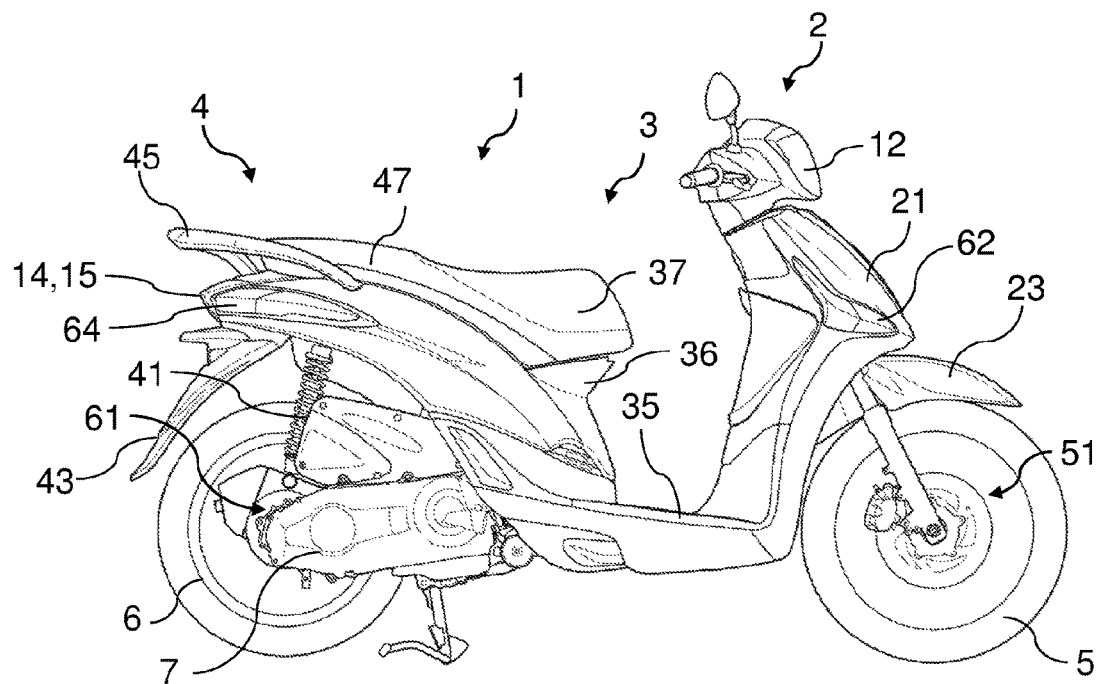
FIG. 1 shows a side view of a non-limiting embodiment of a motorcycle.
Figure 2:
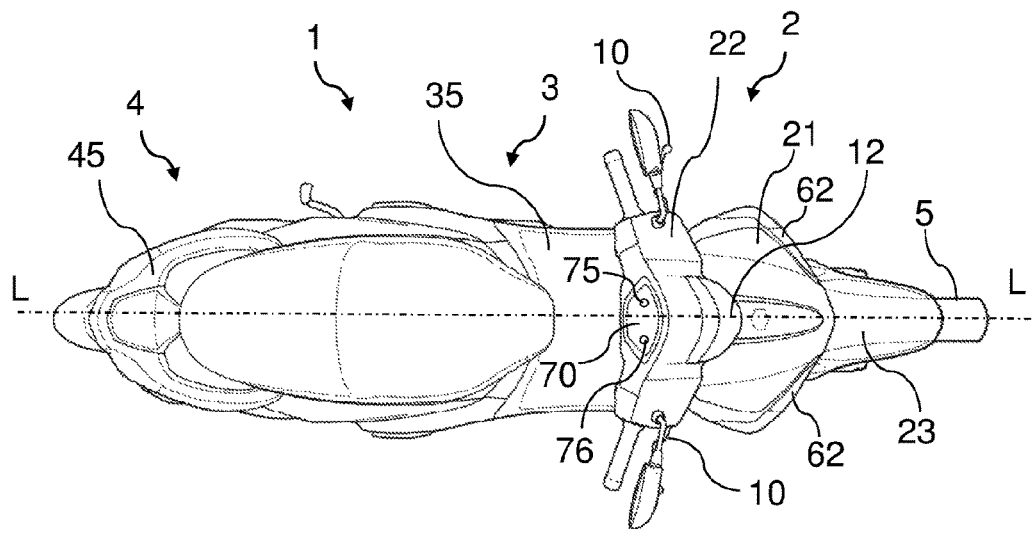
FIG. 2 shows a plan view of the motorcycle in FIG. 1.

Similar or equivalent elements in the accompanying figures are indicated by means of the same reference numerals.

An embodiment of a motorcycle 1 is shown in the accompanying figures, which in the particular example, without because of this introducing any limitation, comprises a two-wheel motorcycle 1, and in particular a two-wheel scooter, having a front wheel 5 and a rear wheel 6.

Hereinafter in the present description, reference will be made to a generic motorcycle 1, hereby meaning the following description may apply in general to any type of motorcycle 1 of category L comprising:

a motorcycle body 2,3,4;
at least two wheels 5, 6 constrained to the motorcycle body 2,3,4;
a traction engine 7, e.g. thermal or electric or hybrid, constrained to the motorcycle body 2,3,4 and operatively connected to at least one of the wheels 5,6.

For example, the aforesaid motorcycle 1 is a two-wheel motorcycle, such as for example a scooter or a motorbike, or a three-wheel tricycle of which at least two front wheels are steering and tilting, or a quadricycle with two pairs of tilting wheels, of which at least two are steering.

The motorcycle body 2,3,4 extends along a longitudinal axis L-L, which is parallel to the driving axis of the motorcycle 1, and has a front part 2, a tail part 4 and a central part 3 comprised between the front part 2 and the tail part 4.

The central part 3 is the part of the motorcycle 1 on which the rider's body resides arranged straddling the motorcycle 1 and/or sitting on the motorcycle 1 in a normal use and driving condition of the motorcycle 1. In the example, the central part 3 comprises a platform 35, an under-saddle support 36 and a front portion 37 of the saddle. In the example, the front part 2 comprises a front shield 21, a steering handlebar 22, a control dashboard 70, the front wheel 5, a braking device of the front wheel 51, two brake levers 10, a front mudguard 23, two front direction indicators 62, a headlight 12.

In the example, the rear part 4 comprises a rear portion 47 of the saddle, a parcel rack 45, one or two rear suspensions 41, the rear wheel 6, a braking device of the rear wheel 61, the traction engine 7, two rear direction indicators 64, a rear mudguard 43, a brake light 15.

The brake light 15 comprises, for example, a LED or incandescent lamp, distinct from the lamp of the tail light 14. In an alternative embodiment, the brake light 15 is integrated in the lamp of the tail light 14, the latter comprising, for example, a dedicated filament intended to work as brake light.

The brake light 15 and the tail light 14 are, for example, integrated in a same light cluster, named rear light cluster, fixed to the tail part 4 of the motorcycle body 2,3,4.

The headlight 12 is fixed to the front part 2 and the tail light 14 is fixed to the tail part 4 and directed in the opposite sense with respect to the headlight 12. In a situation in which the steering handlebar 22 is not turned, i.e. in the condition in which the front wheel 5 and the rear wheel 6 are aligned along the longitudinal axis L-L, the headlight 12 is such to emit an optical beam prevalently centered along the longitudinal axis L-L and directed towards a portion of the ground placed in front with respect to the motorcycle 1. The tail light 14 is such to emit a non-directional optical radiation, generally concentrated at the height of the tail light itself, in order to avoid possible dazzling of the vehicles which follow the motorcycle 1.

The motorcycle 1 comprises at least one optical emergency signaling device 64 fixed to the body of the motorcycle 2,3,4, arranged and oriented so as to be visible by a vehicle which follows the motorcycle 1, i.e. behind the motorcycle 1, and an electronic control unit 100 of the optical emergency signaling device 54, operatively connected to the optical emergency signaling device 64. According to a non-limiting embodiment, the aforesaid optical emergency signaling device 64 comprises two rear direction indicators 64. According to a non-limiting embodiment, the aforesaid optical emergency signaling device could be an additional device with respect to the two rear direction indicators 64. Such optical emergency signaling device 64 may comprise one or more optical sources. According to a non-limiting embodiment, the aforesaid optical emergency signaling device comprises both the two rear direction indicators 64 and the two front direction indicators 62. In the latter case, any pedestrians and/or vehicles in front of the vehicle may be notified of a potential emergency situation. According to a non-limiting embodiment, the aforesaid optical emergency signaling device comprises both the two rear direction indicators 64 and the brake light 15.

The motorcycle 1 comprises a detection system 101, 102 adapted to detect the loss of grip and/or a risk of loss of grip of at least one of the two wheels 5,6 of the motorcycle 1 connected to, or at least partly integrated in the electronic control unit 100. The electronic control unit 100 is adapted and configured to activate the optical emergency signaling device 64, i.e. in the non-limiting example described hereto the rear direction indicators 64 and optionally the front direction indicators 62, if the detection system 101, 102 detects a loss of grip and/or a risk of loss of grip of at least one of the two wheels 5,6, and thus of the motorcycle 1. This occurs in order to indicate to a vehicle which follows the motorcycle 1, i.e. a vehicle behind, a risk of collision with the motorcycle 1. The expression "signaling to a vehicle" must not be interpreted as restrictive in the sense of "signaling to a single vehicle" because the signaling may also be detected by multiple vehicles behind, if there are more than one. According to an embodiment, the aforesaid optical emergency signaling device 64 is activated independently from the acceleration or deceleration of the motorcycle 1.

According to an embodiment, the detection system 101, 102 comprises an Anti Blocking System, ABS 101. As known, an ABS braking system 101 actively intervenes when it detects a blocking of the wheel 5,6 of the motorcycle 1 while braking, caused by loss of grip of the wheel or rather of the tire of the wheel with respect to the road surface, e.g. on the basis of an electrical signal supplied by at least one speed sensor (such as for example a phonic wheel) associated with a respective wheel 5,6 of the motorcycle 1. Alternatively or additionally, the detection system 101, 102 comprises a Traction Control System, TCS 102. As known, a Traction Control System, TCS, also named anti-spin system, is an active electronically controlled system which prevents the slippage of the drive wheels of a vehicle during acceleration and which, above all for motorcycles, may be used also as anti-wheelie system.

Figure 3:
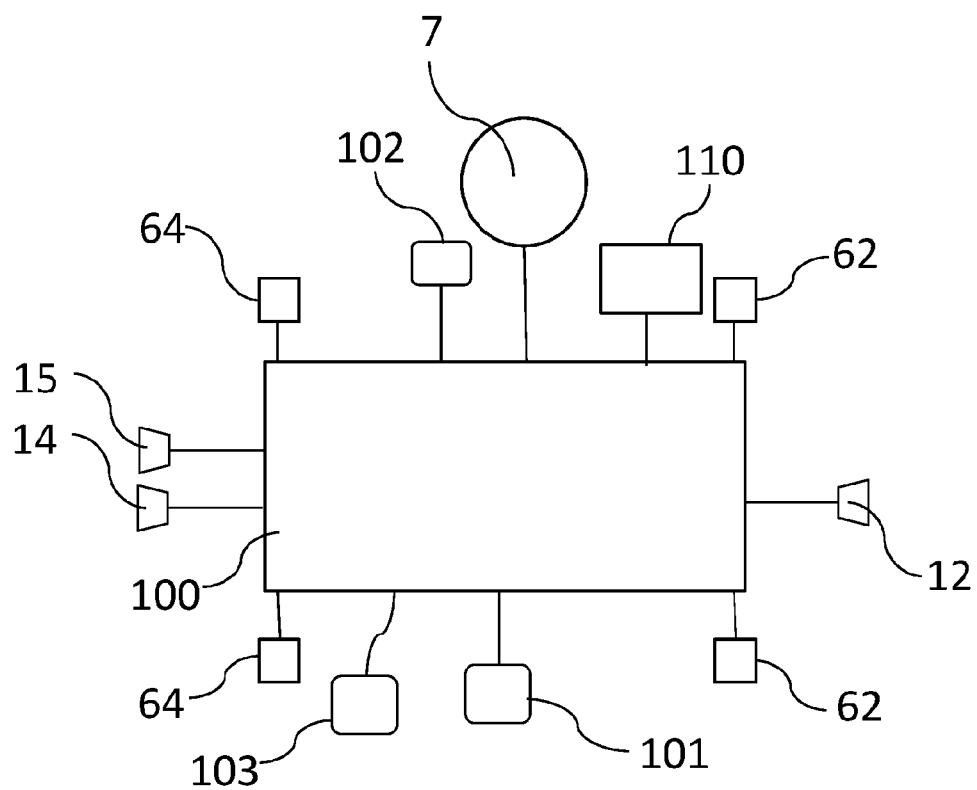
FIG. 3 shows a functional block chart of an embodiment provided by way of example of an electronic control system of the motorcycle in FIG. 1.

We believe that an ABS system and a TCS system are now control systems known to a person skilled in the art and for this reason such systems do not require a description in greater detail. Such control systems are generally provided with one or more sensors and with a processing and control unit adapted to acquire and process the data supplied by the sensors to implement corrective actions, acting for example on the traction engine and/or on the braking system. In the example of FIG. 3, such systems 101, 102 are shown as systems external to the electronic control unit 100 but they could also be partially integrated in the electronic control unit, except for possible sensors which require an installation outside the electronic control unit.

According to a preferred but not limiting embodiment, the electronic control unit 100 is the ECU (Engine Control Unit) of the motorcycle 1 and is such to control also the traction engine 7 of the motorcycle 1. In the example in FIG. 3, the electronic control unit 100 is also such to control other devices and/or systems of the motorcycle 1, such as, for example, the headlight 12 and the tail light 14, the front direction indicators 62, the ABS braking system 101 and/or the TCS traction control system 102.

According to an advantageous embodiment, the electronic control unit 100 is such to activate the optical emergency signaling device 64 lighting it intermittently.

According to an advantageous embodiment, the aforesaid intermittent lighting of the optical emergency signaling device 64 has a duty cycle with a light-on time different from the light-off time. Preferably, the light-on time is either double or half of the light-off time. For example, the light-on time is equal to 1 second and the light-off time is equal to 0.5 seconds.

For example, the electronic control unit 100, as also the optical emergency signaling device 15,64, are also powered by a battery 110 of the motorcycle 1.

According to an advantageous embodiment, the electronic control unit 100 is adapted and configured to compare the speed of the motorcycle 1 with a first threshold speed and turn on the optical emergency signaling device 64 only if the speed of the motorcycle 1 is higher than the first threshold speed. For this purpose, for example, with reference to FIG. 3, the electronic control unit 100 is such to receive an electrical signal carrying information correlated with the speed of the motorcycle 1, for example from a speed sensor 103 envisaged aboard the motorcycle 1 or operatively connected to it. According to a non-limiting embodiment, the first threshold speed is higher than or equal to 5 km/h. However, the first threshold speed may be 0 km/h, i.e. meaning that the optical emergency signaling device 64 is activated when the motorcycle 1 is stationary.

According to a further embodiment, after an activation of the optical emergency signaling device 64, the electronic control unit 100 is adapted and configured to automatically turn off the optical emergency signaling device 64 if it detects that at least one logical deactivation condition is met. For example, such logical condition is a logically codified condition which is representative of a condition of cessation of the loss of grip and/or the risk of loss of grip. For example, such logical condition is detected by means of the signal supplied by the detection system 101, 102, for example by the ABS braking system 101 and/or by the TCS system 102.

For example, the aforesaid logical deactivation condition is met if a time interval has elapsed starting from the cessation of the loss of grip and/or the risk of loss of grip. For example, such time interval is either higher than or equal to 3 seconds.

In further embodiment variants, in addition to activating the optical emergency signaling device 64 described above, the electronic control unit 100 can also activate other signaling devices, such as for example the two front direction indicators 62 and/or the brake light 15, for example intermittently, as described above. Furthermore, additional signaling devices (acoustic, optical or tactile) 75, 76 can be envisaged which inform the driver of the motorcycle 1 of the loss of grip, such as, for example, a graphic warning indicator or warning light 75 on the dashboard 70 envisaged to signal the activation of the ABS braking system and/or a dedicated graphic indicator or warning light 76 on the control dashboard 70 envisaged to signal the activation of the TCS 102.

On the basis of the explanation above, it is thus possible to understand how a motorcycle 1 of the type described above makes it possible to achieve the purposes indicated above with reference to the prior art. Indeed, by virtue of the automatic activation of the optical emergency signaling device it is possible to significantly increase the driving safety of the motorcycle 1 if a loss of grip occurs.

Notwithstanding the principle of the disclosure, embodiments and details may be greatly varied with respect to that described and illustrated herein exclusively by way of non-limiting example without because of this departing from the scope of protection of the disclosure as defined in the appended claims.

The invention claimed is:

1. Motorcycle, comprising:
   a motorcycle body having a front part, a tail part and a central part comprised between the front part and the tail part;
   at least two wheels constrained to the motorcycle body, comprising a front wheel and a rear wheel;
   a traction engine constrained to the motorcycle body and operatively connected to at least one of the wheels;
   at least one optical emergency signalling device fixed to the motorcycle body, arranged and oriented so as to be visible by a vehicle that is following the motorcycle;
   an electronic control unit of the optical emergency signalling device operatively connected to the optical emergency signalling device;
   a detection system adapted to detect a loss of grip and/or a risk of loss of grip of at least one of the two wheels of the motorcycle connected to, or at least partly integrated in, the electronic control unit;
   wherein the electronic control unit is adapted and configured to activate the optical emergency signalling device, if the detection system detects the loss of grip and/or the risk of loss of grip.

2. Motorcycle according to claim 1, wherein the electronic control unit is configured to intermittently turn on the optical emergency signalling device.

3. Motorcycle according to claim 2, wherein said intermittent lighting of the optical emergency signalling device has a duty cycle with a light-on duration different from a light-off duration.

4. Motorcycle according to claim 3, wherein the light-on duration is double or half of the light-off duration.

5. Motorcycle according to claim 1, wherein the electronic control unit is adapted and configured to compare a speed of the motorcycle with a first threshold speed and turn on the optical emergency signalling device only if the speed of the motorcycle is greater than the first threshold speed.

6. Motorcycle according to claim 5, wherein the first threshold speed is greater than or equal to 5 km/h.

7. Motorcycle according to claim 1, wherein the motorcycle comprises two rear turn lights and wherein said optical emergency signalling device comprises said rear turn lights.

8. Motorcycle according to claim 1, wherein the detection system comprises an Anti Blocking System ABS braking system.

9. Motorcycle according to claim 1, wherein the detection system comprises a traction control system TCS.

10. Motorcycle according to claim 1, wherein, after a turning on of the optical emergency signalling device, the electronic control unit is adapted and configured to automatically turn off the optical emergency signalling device if it detects that at least one logical deactivation condition is met.

11. Motorcycle according to claim 10, wherein said logical deactivation condition is a logically codified condition that is representative of a condition of cessation of the loss of grip and/or the risk of loss of grip of the motorcycle.

12. Motorcycle according to claim 11, wherein said logical deactivation condition is met after the elapsing of a time interval starting from the cessation of the loss of grip and/or the risk of loss of grip.

13. Motorcycle according to claim 12, wherein said time interval is greater than, or equal to, 3 seconds.

* * * * *